United States Patent

Schlueter, Jr. et al.

[11] Patent Number: 5,997,974
[45] Date of Patent: Dec. 7, 1999

[54] INVISIBLE SEAM ELECTROSTATOGRAPHIC BELT

[75] Inventors: Edward L. Schlueter, Jr., Rochester; William W. Limburg; Merlin E. Scharfe, both of Penfield, all of N.Y.

[73] Assignee: Xerox Corporation, Stamford, Conn.

[21] Appl. No.: 08/936,696

[22] Filed: Sep. 24, 1997

[51] Int. Cl.[6] .................................................. B32B 3/00
[52] U.S. Cl. ........................ 428/58; 428/192; 474/253; 474/254; 156/136
[58] Field of Search ................................ 474/254, 253; 428/192, 58; 156/137

[56] References Cited

U.S. PATENT DOCUMENTS

| | | | |
|---|---|---|---|
| 1,303,687 | 5/1919 | Leffler . | |
| 2,461,859 | 2/1949 | Vasselli . | |
| 2,792,318 | 5/1957 | Welch . | |
| 5,286,586 | 2/1994 | Foley et al. | 430/56 |
| 5,413,810 | 5/1995 | Mastalski | 427/171 |
| 5,487,707 | 1/1996 | Sharf et al. | 474/253 |
| 5,714,290 | 2/1998 | Yu et al. | 430/56 |

FOREIGN PATENT DOCUMENTS

| | | |
|---|---|---|
| 62-299878 | 12/1987 | Japan . |
| 63-113470 | 5/1988 | Japan . |
| 02234184 | 9/1990 | Japan . |
| 05016278 | 1/1993 | Japan . |

*Primary Examiner*—Christopher Raimund

[57] ABSTRACT

An endless flexible seamed belt with a mechanically and electrically invisible seam, substantially equivalent in performance to a seamless belt, is formed by joining two ends of substrate material, each end of which has a plurality of mutually mating elements in a puzle cut pattern which are in interlocking relationship. After the two ends are joined, an bonding is applied to the seam of the belt. When the belt is to be an electrostatographic imaging member, the electrostatics of the belt become very important. The two ends of a flexible substrate with a conductive coating applied thereto are interlocked and a conductive bonding is applied to the gap between the interlocking surfaces. The undercoating layer can then be applied to the adhered seam in order to smooth the seamed surface for application of the charge generating layer and the charge transfer layer. The undercoating layer may be relatively thicker than current undercoating layers to insure that the seam surface is smooth.

17 Claims, 8 Drawing Sheets

INVISIBLE SEAM ELECTROSTATOGRAPHIC BELT

Attention is hereby directed to U.S. patent application Ser. No. 08/297,200 (D/94226) entitled "Puzzle Cut Seamed Belt", now U.S. Pat. No. 5,514,436, issued May 7, 1996; U.S. patent application Ser. No. 08/297,158 (D93563) entitled "Puzzle Cut Seamed Belt With Strength Enhancing Strip", now abandoned, continuing U.S. patent application Ser. No. 08/522,622, filed Aug. 31, 1995 now U.S. Pat. No. 5,721,032; U.S. patent application Ser. No. 08/297,201 (D/94225) entitled "Puzzle Cut Seamed Belt With Bonding Between Adjacent Surface By UV Cured Adhesives", now U.S. Pat. No. 5,487,707, issued Jan. 30, 1996; U.S. patent application Ser. No. 08/297,206 (D/94226Q) entitled "Endless Seamed Belt with Low Thickness Differential Between the Seam and the Rest of the Belt", now U.S Pat. No. 5,549,193 and U.S. patent application Ser. No. 08/297,203 (D/94227) entitled "Puzle Cut Seamed Belt with Bonding Between Adjacent Surfaces" pending, all commonly assigned to the assignee of the present invention and filed on Aug. 29, 1994.

This invention relates generally to an endless seamed belt, and more particularly concerns the production of a mechanically and electronically seamless electrostatographic belt.

Initially, belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic imaging apparatus and processes for use as photoreceptors, intermediate sheet and/or image transport devices, fusing members or transfix devices it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding, strength and flexibility because of the limited contact area formed by merely butting the two ends of the belt material. Furthermore, belts formed according to the butting or overlapping technique provide a bump or other discontinuity in the belt surface leading to a height differential between adjacent portions of the belt, of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Furthermore, photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturb the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet. In these applications, it is desired to provide a seam height differential between the seam and the unseamed adjacent portions less than 0.001 inch. In addition, the presence of the discontinuity in belt thickness reduces the flex life and continuity of strength of the belt which for prolonged use is desirably 80-90% that of the parent material unseamed. In addition, the discontinuity or bump in such a belt may result in inaccurate image registration during development, inaccurate belt tracking and overall deterioration of motion quality, as a result of the translating vibrations.

Currently, seamless photoreceptor technology involves the use of electrodeposited nickel on a smooth mandrel or electrode followed by chilling to permit removal from the electrode. Although this process is applicable to large belts running over large diameter rollers, there are substantial concerns regarding the fragile nature of these crinkle prone substrates. The edges are sharp and require coating with a polymer to protect production personnel and service technicians. Environmental factors such as the disposal of Ni-containing electroplating baths, wash effluent and after end of life disposal of photoreceptors produced by current seamless processes are also of concern. A second method for seamless belts utilizes injection blow molding, however it is a complex and costly option.

The previously mentioned related puzzle cut patent applications have focused on the mechanical aspects of a "seamless" puzzle cut seam for flexible belts to be used in electrostatographic machines. However, there is also a need to specifically address the electrical properties of a puzzle cut seam to insure that the seam is also electronically "seamless". It is highly desirable to have the seaming method and invisibilization process compatible with current coating technologies.

The following disclosures may be relevant to various aspects of the present invention:

U.S. Pat. No. 1,303,687
Inventor: C. Leffler
Issued: May 13, 1919
U.S. Pat. No. 2,461,859
Inventor: A. J. Vasselli
Issued: Feb. 15, 1949
U.S. Pat. No. 2,792,318
Inventor: H. P. Welch
Issued: May 14, 1957
U.S. Pat. No. 5,286,586
Inventor: Foley et al.
Issued: Feb. 15, 1994
U.S. Pat. No. 5,413,810
Inventor: Mastalski
May 9,1995

Some relevant portions of the foregoing disclosures may be briefly summarized as follows:

U.S. Pat. No. 1,303,687 teaches forming a container from a body blank with the ends dovetailed together and a covering sheet which extends beyond the end of the body and has its extending portion secured down, overlapping the dovetail joint to secure and finish the container. In forming the container, the body blank is wrapped around a forming mandrel of the desired shape and the two dovetail ends are interlocked. At the same time the extending ends of the covering sheet, which are provided with adhesive, are stuck down overlapping the joint.

U.S. Pat. No. 2,461,859 teaches an endless flexible belt with a patterned dovetail joint. A single die cut may cut both ends of the patterned dovetail joint at the same time. The ends of the belt are cut to form a male and female end with a plurality of spaced dovetailed tabs, the female end fitting into the male end and the dovetailed tabs interlocking with each other. An adhesive may be used at the belt joint.

U.S. Pat. No. 2,792,318 discloses forming splice joints in fibrous material, each joint being cut so that an interlocking tongue and groove pattern is formed. The tongues and grooves may be different shapes. In the finished product, the joints are oriented at a diagonal with respect to the sides. A coating material may be used to maintain the interfitted tongues and grooves, however, it is the interlocking connection of the tongues and grooves that provides the tensile strength of the joint.

U.S. Pat. No. 5,286,586 disclose fabricating thin flexible endless belts used in electrophotographic printing systems. The patents teach overlapping the ends of the belt and welding the ends together to form an endless belt.

U.S. Pat. No. 5,413,810 teaches a fabricating a seamless belt by application of coatings to an endless substrate. The flow of fluid is manipulated to orient a selected portion of the surface of the substrate to an angle to a direction of application of a coating.

All of the above references are herein incorporated by reference.

SUMMARY OF THE INVENTION

One aspect of the invention is drawn to a process for fabricating an endless flexible seamed electrostatographic belt formed by joining two ends of a flexible substrate. Each end of the substrate has a plurality of mutually mating elements in a puzzle cut pattern, the opposite surfaces including interlocking of the two ends of the flexible substrate to prevent separation. The surfaces of the mutually mating elements have a gap therebetween to which adhesive material is applied such that there is absent any substantial thickness differential between the seam and the portions of the belt adjacent the seam. An undercoating layer is applied to the flexible substrate and the seam such that the belt surface, including the seam, is substantially smooth.

Another aspect of the invention is drawn to an endless flexible seamed electrostatographic belt formed by joining two ends of a flexible substrate, each end of which has a plurality of mutually mating elements in a puzzle cut pattern, the opposite surfaces of which are in interlocking relationship to prevent separation of the two ends. The surfaces of the mutually mating elements define a gap therebetween to which adhesive material is supplied to form a bonded seam. An undercoating layer covers the substrate and the bonded seam such that the belt surface, including the bonded seam, is substantially smooth.

Yet another aspect of the invention is drawn to an endless flexible seamed electrostatographic imaging belt formed by joining two ends of a flexible substrate with a conductive layer applied thereto, each end of which has a plurality of mutually mating elements in a puzzle cut pattern, the opposite surfaces of which are in interlocking relationship to prevent separation of the two ends. The surfaces of the mutually mating elements define a gap therebetween. Conductive adhesive material is applied to the gap between the surfaces of the mutually mating elements to form a bonded seam. An undercoating layer covers the substrate and the bonded seam such that the belt surface including the bonded seam is substantially smooth and a charge generating layer covers the undercoating layer and a charge transport layer covers the charge generating layer to form the electrostatographic imaging member.

An endless flexible seamed belt with a mechanically and electrically invisible seam that is substantially equivalent in performance to a seamless belt. The seamless belt is formed by joining two ends of material from which the belt is fabricated, each end of which has a plurality of mutually mating elements in a puzzle cut pattern which are in interlocking relationship. The initial belt material includes a substrate and a conductive layer and after the two ends are joined, a conductive adhesive is applied to the seam of the belt. Once the seam is bonded, an undercoating layer is be applied to the adhered seam in order to smooth the seam surface for application of the charge generating layer and charge transfer layer. The undercoating layer may be relatively thicker than current undercoating layers to insure that the seam surface is smooth.

BRIEF DESCRIPTION OF THE DRAWINGS

Other features of the present invention will become apparent as the following description proceeds and upon reference to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

With continued reference to the Figures and additional reference to the following description the invention will be described in greater detail. The seam formed according to the present invention is one of enhanced strength, flexibility and mechanical life which is held together by the geometric relationship between the ends of the belt material, which are fastened together by a puzzle cut, meaning that the two ends interlock with one another in the manner of an ordinary puzzle and wherein the seam has voids or a kerf 20 between the surfaces of mutually mating elements, the opposite surfaces of the puzzle cut pattern being joined together to enable the seamed flexible belt to essentially function as an endless belt. The joining of the opposite surfaces of the mutually mating elements forming the seam may be either a physical joining, chemical joining or some combination of physical and chemical joining. The opposite surfaces of the puzzle cut pattern may alternatively be bound with an adhesive which is physically and chemically compatible with the belt material. Typically, this joining provides a bonding between the opposite surfaces of the mutual mating elements which provides an improved seam quality and smoothness with substantially no thickness differential between the seam and the adjacent portions of the belt thereby providing enhanced imaging, registration and control as discussed above. In this regard, it should be noted that the lower the differential in height, the faster that the belt may travel. In any case, the opposite surfaces of the puzzle cut pattern being joined together are bound with sufficient physical integrity to enable the seamed flexible belt to essentially function as an endless belt.

Figure 8:
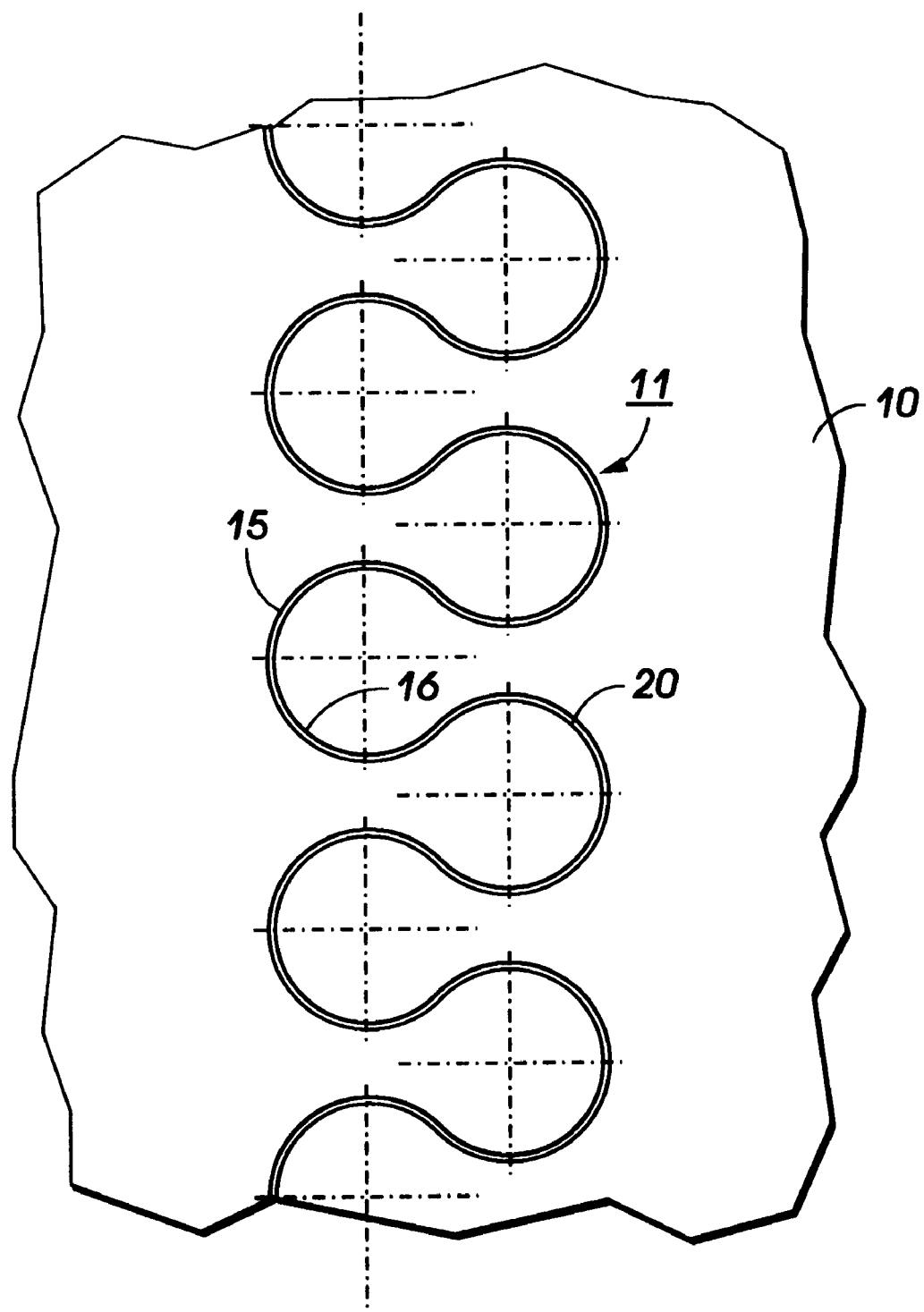
FIG. 8 is a greatly exaggerated in scale representation of the seam type geometry, a very narrow kerf.
Figure 9:
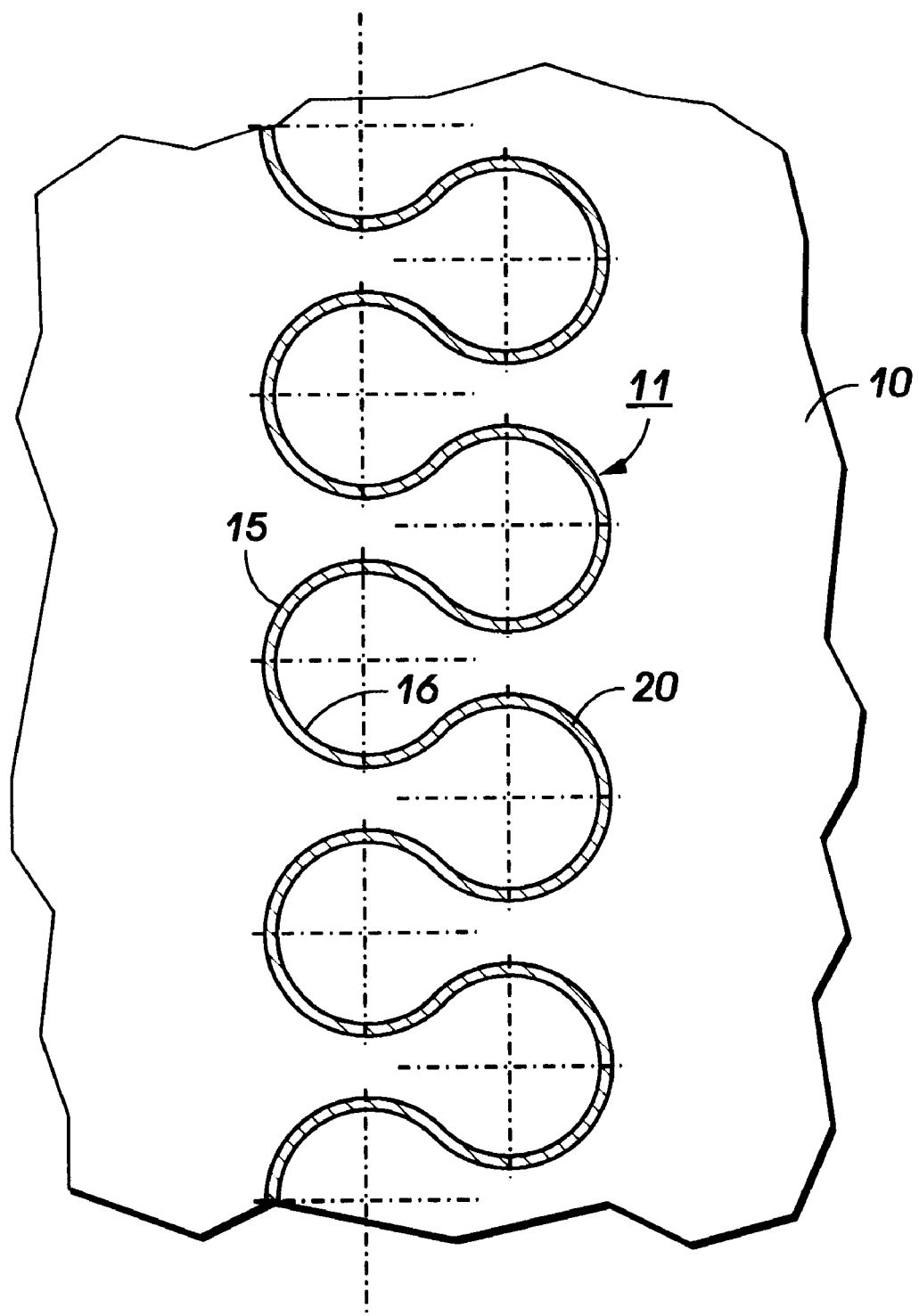
FIG. 9 is a belt seam with the kerf filled with belt compatible material represented by cross hatching.

The two ends of the seamed belt may be joined by heating such as by welding, including ultrasonic welding, arc welding and impulse welding, wherein top and bottom elements similar to those that are used to seal plastic bags have two arms which apply pressure and then the elements are heated. In the case of thermoplastic belt materials the thermoplastic nodes may be deformed by heating and may flow into the voids to form or link together and physically form the bond. As illustrated in FIG. 8 a very narrow kerf between thermoplastic ends of the belt may be filled by the mere application of heat and pressure. This is like welding the two nodes together. This technique of course is not applicable to thermoset materials.

Alternatively the two ends of the belt having the puzzle cut pattern at each end may be joined by a chemical reaction. This happens in the instance where the belt material is a thermoplastic and upon heating the thermoplastic at least softens, if not melts, and flows to fill the voids in the seam.

Another alternative is to apply an adhesive to the voids between the mutually mating elements, and in particular, to the opposite surfaces of the puzzle cut pattern. With the use of an adhesive a much wider kerf may be used than the very narrow kerf that may be used for bonding by heat and pressure only thermoplastic materials. This also permits the adhesive to wick into the void or kerf areas. In this regard, the viscosity of the adhesive is important since it's performance depends on it's ability to wick into the voids or the kerf 20 between adjacent cut pieces of the pattern. Accordingly, a relatively high viscosity adhesive will not perform as satisfactorily as a low viscosity adhesive. In addition, the surface energy of the adhesive must be compatible with the material from which the belt is fabricated so that it adequately wets and spreads in the belt seam. As previously described good adhesion is required to enable the performance requirements previously discussed with regard to comparing it to the original material. If the belt is made of a thermoplastic or thermoset material, it is quite convenient to use thermoplastic or thermoset adhesives which melt and flow at a temperature below that of the belt material but do not soften enough or flow during the belt's operation. The kerf 20, the distance between adjacent surfaces of the mutually mating elements of the belt ends can be built into the belt ends by way of a mechanical die or it can be built into by way of cutting with a laser pattern. If the belt material is a thermoplastic, a thermoplastic or thermoset or otherwise crosslinked adhesive may also be used and indeed may be based on the same material that the belt is fabricated from. However, if the belt material is thermosetting then a thermoplastic or thermoset adhesive may be used to fill the voids between the opposite surfaces of the puzzle cut pattern. Typically, a hot melt adhesive may be used, which is one that is solid at room temperature, however, when heated will flow. Typical thermoplastic hot melt adhesives include polyamides, urethanes, polyesters. Typical thermosetting materials include epoxies, polyimides, cyanoacrylates and urethanes. Following bonding, whether it be physical, chemical or by way of adhesive or any combination of the above, although it may not be necessary, it may be desirable to apply pressure to flatten the seam to make it as uniform as possible and control any thickness differential.

Figure 1:
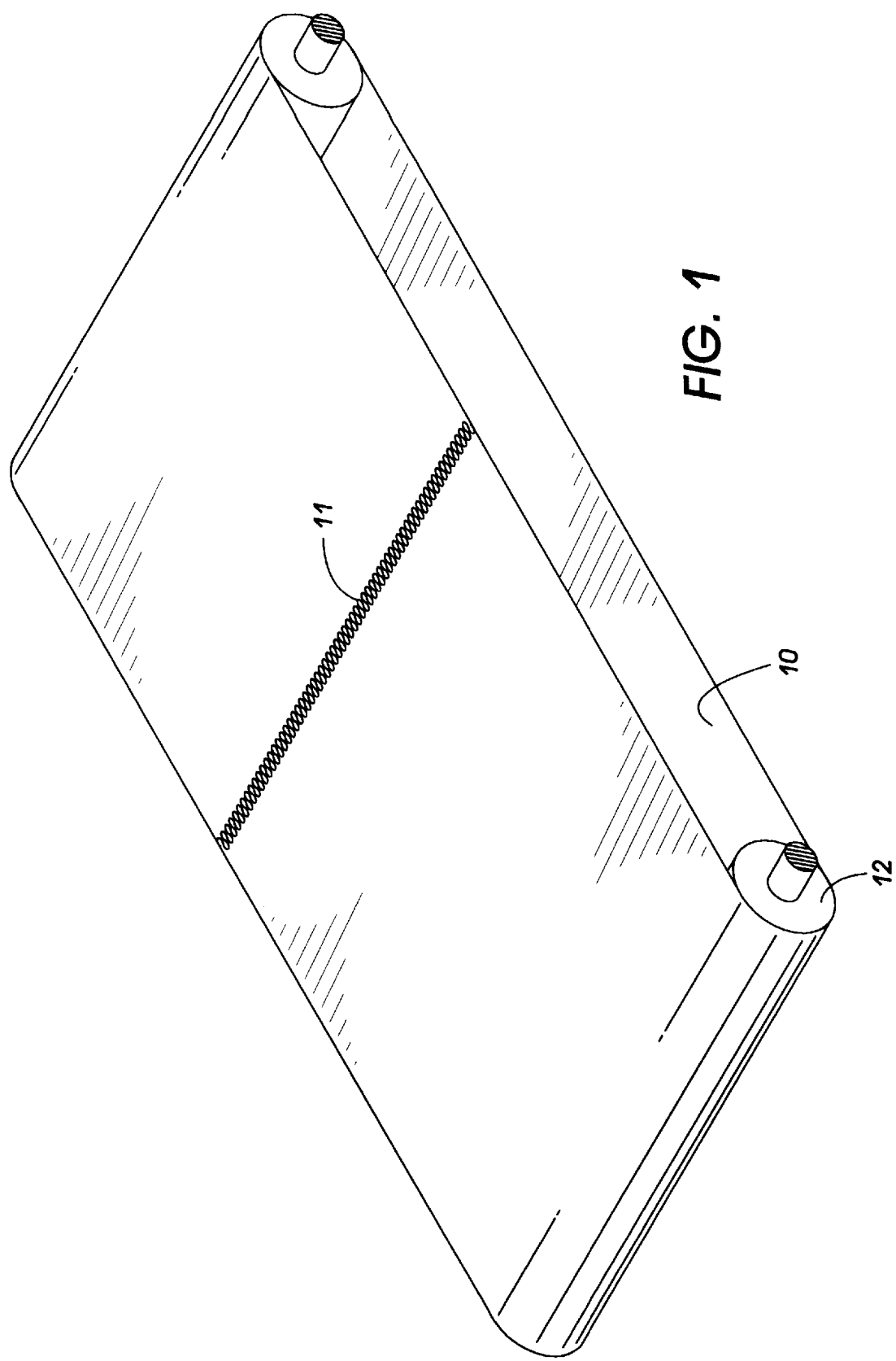
FIG. 1 is an isometric representation of the flexible puzzle cut seamed belt providing a mechanically invisible and substantially equivalent seam in performance to that of a seamless belt.

Referring to FIG. 1, it should be noted that the mechanical interlocking relationship of the seam 11 is present in a two dimensional plane when the belt 10 is on a flat surface, whether it be horizontal or vertical. while the seam is illustrated in FIG. 1 as being perpendicular to the two parallel sides of the belt it will be understood that it may be angled or slanted with respect to the parallel sides. This enables any noise generated in the system to be distributed more uniformly and the forces placed on each mating element or node to be reduced.

The endless flexible seamed belt may be made of any suitable material. Any suitable belt material may be employed. Typical materials include, photoreceptor materials which may be multilayered such as those described in U.S. Pat. No. 4,265,990, as well as a variety of thermoplastic and thermosetting belt materials. Typical materials include polyesters, polyurethanes, polyimides, polyvinyl chloride, polyolefins such as polyethylene and polypropylene and polyamides such as nylon, polycarbonates, acrylics. In addition, elastomeric materials such as silicones, fluorocarbons such as Vitons E. I. DuPont™, EPDM and nitrites etc. For certain purposes, metallic; cloth and even paper may be used. The belt material is selected to have the appropriate physical characteristics for specific utilities such as tensile strength, Young's modulus, typically $1 \times 10^3$ to $1 \times 10^6$, electroconductivity, typically $10^8$ to $10^{11}$ ohm cm volume resistivity, thermal conductivity, stability, flex strength and in certain applications, such as transfix, being capable of being subjected to high temperatures. Other important characteristics of the belt material include surface energy desired low for good toner release, for example, gloss, dielectric constant and strength.

The puzzle cut pattern may be formed according to any conventional shaping technique, such as by die cutting or laser cutting with commercially available lasers, such as a $CO_2$ laser or excimer laser generating a beam of sufficient width and intensity that within an acceptable time will provide the desired cut. Following cutting by the laser beam it can be deburred and cleaned by air, ultrasonics or brushing if necessary. In addition to puzzle cut patterns formed by joining the two ends, they may be formed on each of the ends by a male and female punch with the belt material in between which punches out the shape. Alternatively, it could be a pattern on a wheel which rolls over the material.

Figure 2:
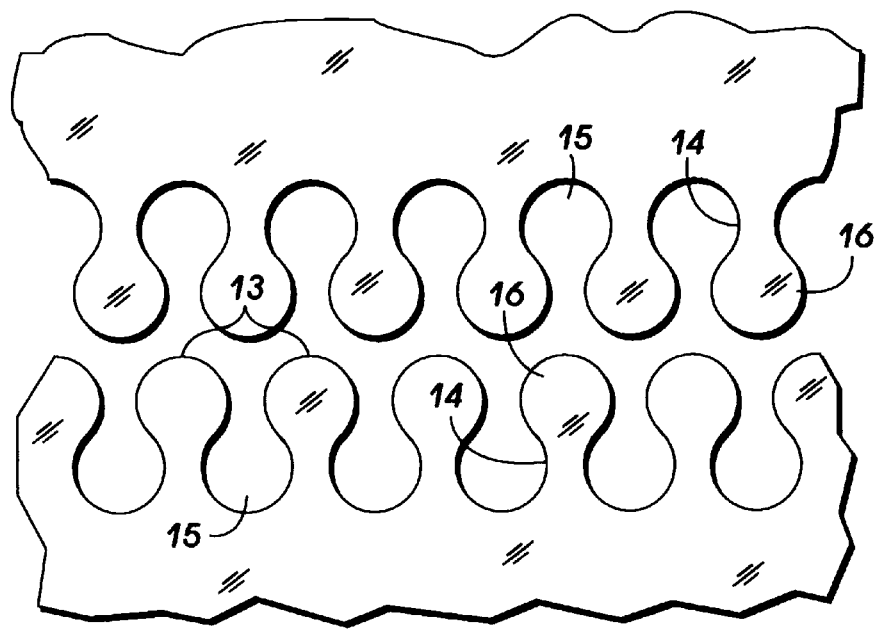
FIG. 2 is an enlarged view of a puzzle cut pattern used on both joining ends of the belt material to provide interlocking elements.
Figure 3:
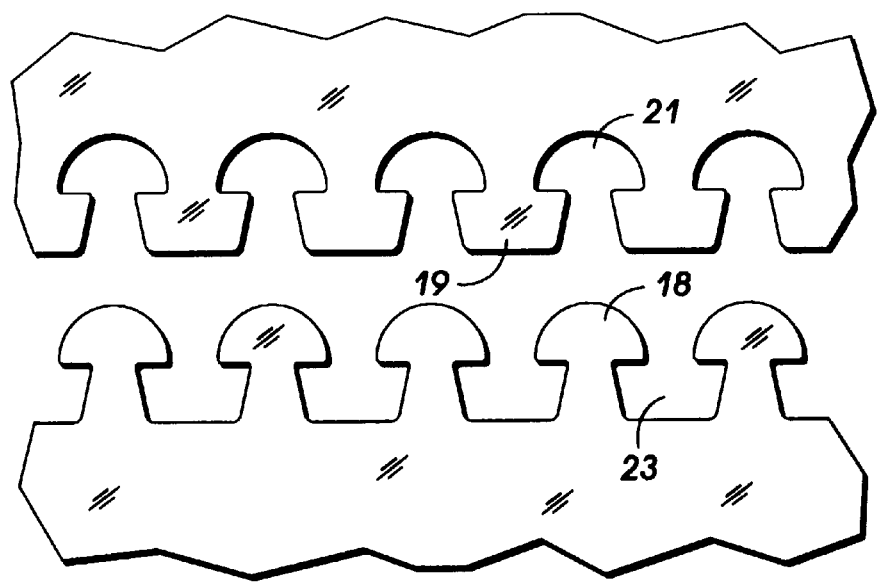
FIG. 3 is illustrative of an alternative configuration wherein male and female interlocking portions having curved mating elements are used in the two ends of the belt material which are joined.
Figure 4:
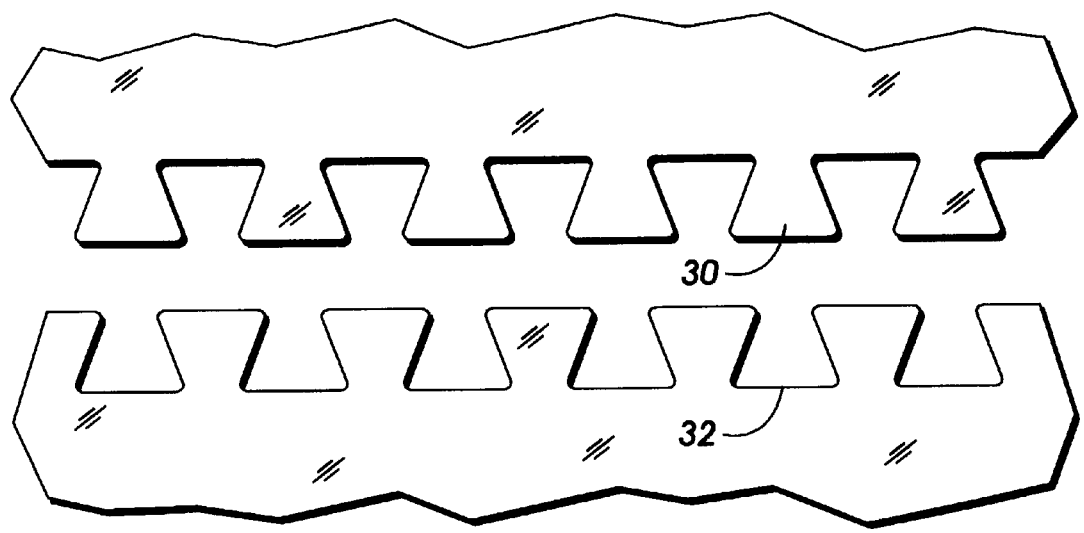
FIG. 4 is a further alternative embodiment wherein the interlocking elements form a dovetail pattern having curved mating elements.
Figure 5:
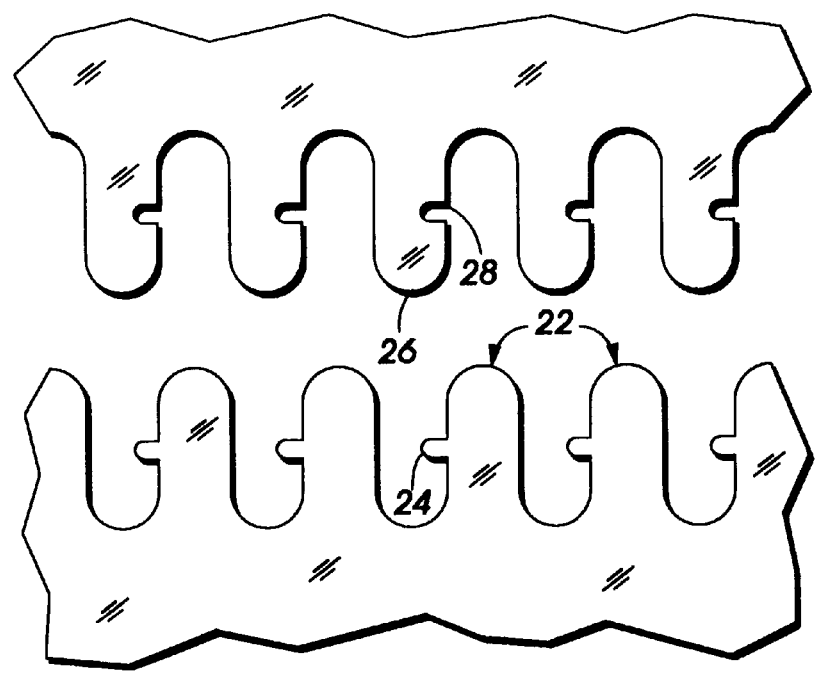
FIG. 5 is an additional alternative embodiment wherein the interlocking relationship between the puzzle cut pattern on both ends is formed from a plurality of finger joints.

As may be observed from the drawings, the puzzle cut pattern may take virtually any form, including that of nodes such as identical post or neck 14 and head or node 16 patterns of male 13 and female 15 interlocking portions as illustrated in FIG. 2, or a more mushroom like shaped pattern having male portions 18 and 19 and female portions 21 and 23 as illustrated in FIG. 3 as well as a dovetail pattern as illustrated in FIG. 4. The puzzle cut pattern illustrated in FIG. 5 has a plurality of male fingers 22 with interlocking teeth 24 and plurality of female fingers 26 which have recesses 28 to interlock with the teeth 24 when assembled. It is important that the interlocking elements all have curved mating elements to reduce the stress concentration between the interlocking elements and permit them to separate when traveling around curved members such as the rolls 12 of FIG. 1. It has been found that with curved mating elements that the stress concentration is lower than with square corners where rather than the stress being uniformly distributed it is concentrated leading to possible failure.

It has been found that with curved mating elements that the stress concentration is lower than with square corners where rather than the stress being uniformly distributed it is concentrated leading to possible failure. The mechanical bonding, strength and flexibility of the bond should be capable of supporting a belt cycling of at least 500,000 cycles and the height differential between the seamed portion and the unseamed portion on each side of the seam about 0.001 inch and the seam have a tensile strength of at least 80% and preferably 90% of the parent belt material strength.

The following is a discussion of the interrelationship among the various belt and material parameters involved in the mechanical integrity of the seam. The mechanical integrity of the seam was examined and analyzed for a number of configurations and in particular for the preferred configuration which involves nodes forming parts of a circle and interconnecting via a neck on the opposite side. To determine the deflection under loading conditions, each such node is treated as a beam fixed at the narrowest part of the neck joining the node to the base and the deflection of each tooth (node and neck) is calculated in terms of the orientation of the load relative to the beam. To assure that the seam will not come apart under load, it is imposed that the maximum deflection of each tooth, when the load, under worse conditions, is normal to the beam, would not exceed the thickness of the belt itself. Clearly, if the deflection of the tooth is in excess of the thickness of the belt then the seam will come apart. Under the above brief analysis, a master relationship connecting a material parameter M typical of the configuration with a geometric parameter G such that the belt will not come apart under loading.

$$M = \frac{1-G}{\left(1+\sqrt{4-\frac{1}{G^2}}\right)^3} \quad (1)$$

Figure 6A:
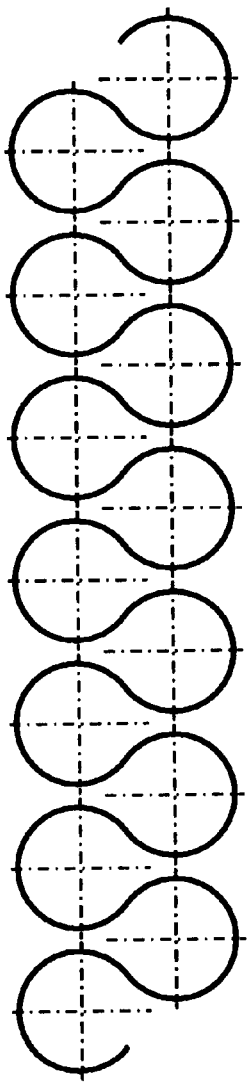
FIGS. 6A, 6B and 6C are three representations of the puzzle cut configuration.
Figure 6B:
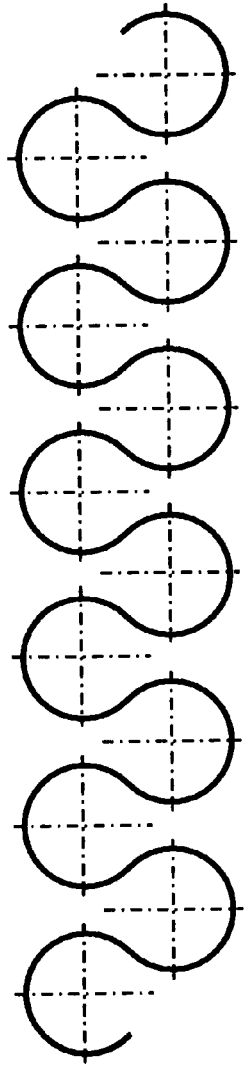
Figure 6C:
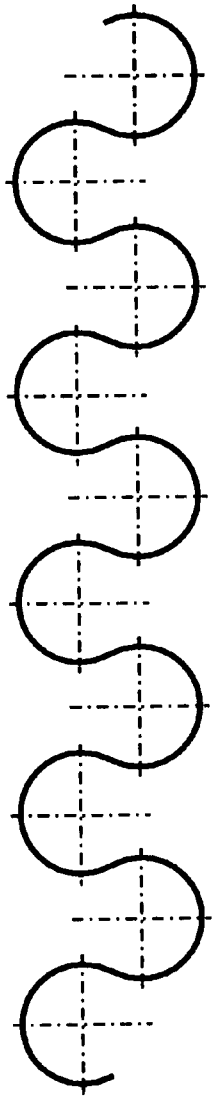

In this relationship $M$ is a dimensionless quantity given by $$M = \frac{4NR^3}{Et^4} \quad (2)$$

and $G$ represents the ratio $$G = \frac{2R}{w} \quad (3)$$

where N is the total load per unit width (i.e. lbs/in.) acting on the belt, E is the modulus of elasticity of the belt material t, the thickness of the belt, R the radius of the circular node forming the seam, and w is the wave length of one whole period between two adjacent nodes. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying equation (1), by virtue of the fact that there is an infinite number of combinations of the variables involved in that particular pair of values of M and G. Inspection of the geometry of the node shows that the structure is characterized by two main features: the shoulder, or that portion where there is interference between adjacent teeth, which supports the seam, and the neck of each tooth which represents its strength under loading. The size of the shoulder should be sufficient to insure mechanical integrity of the seam without making the neck too small as to weaken its strength. In this regard attention is directed to FIGS. 6A, 6B and 6C wherein it can be visually observed that the size of the neck in FIG. 6A is too small and the size of the shoulder in FIG. 6C does not provide sufficient interference contact while the geometry in FIG. 6B appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the tooth is zero and the node has no strength. Once either M or G is known the entire configuration becomes determinate with the help of the above equations and other standard geometric relationships. Measurements on actual belts have generally confirmed the above analysis. To illustrate the solution methodology, suppose a belt material of Young's modulus E=5×105 psi and thickness t=0.004" is subjected to a tension N=2.0 lb./in. of belt width. H is the perpendicular height between centers of one node or one side of the seam and a node on the other side of the seam. The solution possibilities are given in Table 1 below such that the seam will not come apart. If a value G=0.6 is chosen as a compromise between seam integrity and node strength, we find

| | |
|---|---|
| Node Diameter | D = 0.448 mm |
| Period | w = 0.747 mm |
| Neck Width | g = 0.299 mm |
| Node Height | H = 0.69696 |

| G | 1/M | D | W | g | H |
| --- | --- | --- | --- | --- | --- |
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |
| .9800 | 1006.3020 | .1277 | .1303 | .0026 | .2376 |
| .9900 | 2026.1140 | .1012 | .1022 | .0010 | .1885 |

N, lb/in = 2.0
E, psi = 500000
t, in = .004

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

With reference to the embodiment illustrated in FIG. 2, the seam may be typically of the order of one inch wide on a belt which is 16 to 18 inches long depending on roll diameter, material modulus or other parameters and the post and head pattern may be formed from a male/female punch cut with each end being cut separately and subsequently being joined to form the seam with a roller similar to that used as a wall paper seamer rolled over the seam by hand to complete the interlocking nature of the puzzle cut pattern.

Figure 7:
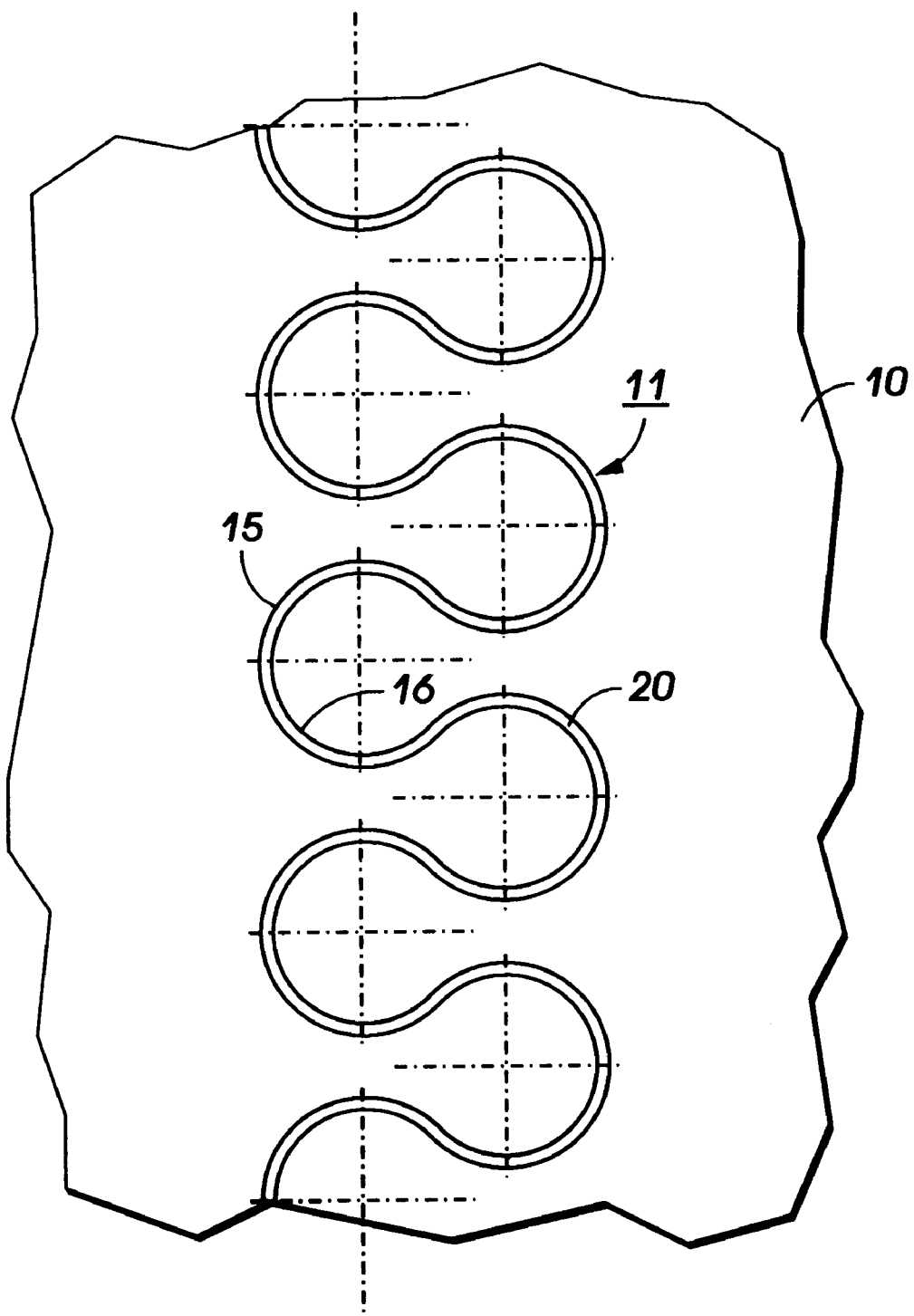
FIG. 7 is a greatly exaggerated in scale representation illustrating essentially no space between interlocking elements.

The two ends of the belt material are joined by physically placing them together in interlocking relationship. This may require the application of pressure to properly seat or mate the interlocking elements. The adhesive material may be the same or it may be different from the material from which the belt was fabricated and may be selected from those materials previously discussed. Typically, it is a heat sensitive thermoplastic or thermoset material. It may be either chemically, and/or physically bound to the belt material. The chemical and/or physical bond between the adhesive and the belt material may also be formed by the application of heat and/or pressure after the adhesive has been applied In a particular application impulse welding may be applied wherein heat and pressure are simultaneously applied to at least soften the belt material and the compatible adhesive material 17 (see FIG. 7) so that it fills the kerf and forms an adhesive bond with the belt material. In this regard, it is important that the heat applied does not exceed that which would both form the seam and break it by melting it or decomposing it. Other heat sources include conventional heated rolls, a simple heated iron, ultrasonic welding or a two roll heated nip providing a combination of heat and pressure.

Preferably, the adhesive material applied is of a thickness to provide a quantity of adhesive to fill the kerf spaces between the two sides of the puzzle cut seam member. In this regard it should also be noted that it may be possible to first apply the heat to the seam of the belt material and the adhesive and subsequently apply pressure while it is still in a softened condition to force the softened adhesive into kerf or the spaces between the two sides of the puzzle cut seam members. The pressure applied should be sufficient to fill the kerf and to minimize the thickness of any bonded joint. While this process clearly provides a physical bonding between material of the belt seam and the adhesive material, it may also provide a chemical bond. A typical example of this would be one wherein the belt material is a polyimide and the adhesive is a polyimide.

Following fabrication, the belt may be finished by way of buffing or sanding and further, may have an overcoating applied, typically, of a thickness of 0.001 to 0.003 inch in thickness which can be initially applied to the unseamed belt, the belt seam and the seamed area filled from the back of the belt to maintain the uniformity of the functional surface. Preferably, and by far the most economical matter is to form the belt seam initially and then apply the desired overcoating.

The seamed belt according to the present invention may be fabricated in an environmentally acceptable manner in that no solvents are required. The adhesive may be applied to the belt in a suitable manner, such as by being applied from a tubular applicator by squeezing or pushing or being applied by a spatula. It may be applied on one or both sides of the kerf or voided area and is preferably smoothed on it's surface to provide a smooth surface in the seam area of the belt.

EXAMPLE 1

Using a die cutter, a one inch wide polyimide material was mechanically cut to provide a radius of the nodes of about 0.5 mm and the center to center spacing of about 0.70 mm. The ends of the strip of the one inch width polyimide material were then interlocked and rolled with the roller to flatten the seam. A thermoplastic polyamide web material was placed on the lower jaw of an impulse welder Vertrod Corp. Model No. 24H/HT1/4. The previously joined seam was then centered over the webbing material, heat at approximately 350° F. and light pressure were then applied to melt the polyamide web material into the seamed area for approximately 20 seconds. With the seam remaining on the lower jaw of the impulse welder, both sides of the seam were then masked with conventional masking tape, a bead of a polyimide adhesive was squeegeed into the area formed by the masking tape and permitted to flash to release solvent for about 15 minutes after which the masking is removed. The impulse welder is once again clamped again and the seam receives two cycles of 350° F. heat for 35 seconds. The seam remained in the impulse welder for 30 seconds before it was removed and postcured at 400° F. for 2 hours and then room temperature dwell for at least 12 hours. Fourteen, 12 inch long belts were tested in the flex tester and all had flexing cycles exceeding 750,000 with 9 samples exceeding one million cycles. Of the nine belts, which flexed for over a million cycles, the test was discontinued without any of the belts failing. The samples were tested in a flex tester using two pounds in loading, 17 inch per second process speed around the 25 mm drum rollers.

As explained above, the puzzle cut seam height joined by adhesive is less than 20 microns, which is substantially lower than conventional welds. The belts discussed in FIGS. 1–9 will generally be used as intermediate transfer belts, however the low puzzle cut seam height can also be used to advantage in electrostatographic imaging members as shown in FIG. 10.

Figure 10:
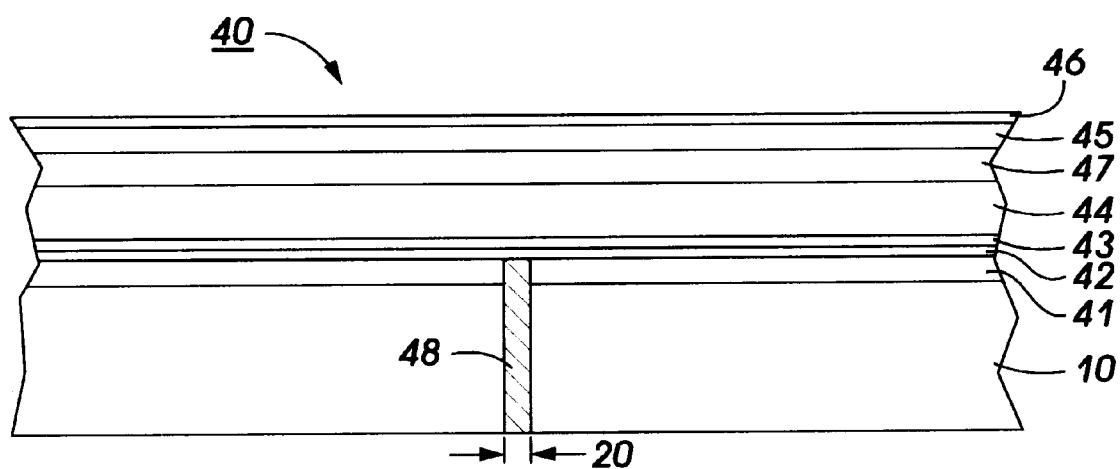
FIG. 10 is a belt seam with coatings applied to the belt.

The electrostatographic imaging member 40 shown in FIG. 10 includes a supporting substrate 10, an adhesive filled void or kerf 20, an electrically conductive ground plane 41, a charge blocking layer 42, an adhesive layer 43, a charge generating layer 44, a charge transport layer 45 and optionally, a protective overcoating layer 46 . Having a low belt seam height allows undercoating layers (UCL) to be applied over the adhesive filled seam such that an electrically invisible seamed imaging member is produced. The charge generating layers (CGL) and charge transport layers (CTL) can then be applied over the "seamless" surface.

The supporting substrate 10 may be any suitable composition in the form of a flexible belt. The substrate may be opaque or substantially transparent and may comprise number suitable materials having the required mechanical properties. The substrate 10 may further be provided with an electrically conductive surface (ground plane). Accordingly, the substrate 10 may comprise a layer of an electrically nonconductive or conductive material such as an inorganic or organic composition. As electrically non-conducting materials, various resins known for this purpose including polyesters, polycarbonates, polyamides, polyurethanes, and the like may be used. The substrate 10 in the form of an flexible belt may comprise a commercially available biaxially oriented polyester known as Mylar.

The preferred thickness of the substrate layer depends on numerous factors, including economic considerations. The thickness of this layer is preferably from about 65 micrometers to about 150 micrometers. The surface of the substrate layer is preferably cleaned prior to coating to promote greater adhesion of the deposited conductive coating. Cleaning may be effected by exposing the surface of the substrate layer to plasma discharge, ion bombardment and the like.

The electrically conductive ground plane 41 (if needed) may be an electrically conductive layer such as a metal layer which may be formed by any suitable coating technique such as a vacuum depositing technique with metals such as aluminum, zirconium, niobium, tantalum, vanadium, hafnium, titanium, nickel, stainless steel, chromium, tungsten, molybdenum and the like and mixes and alloys thereof. The conductive layer may vary in thickness over substantially wide ranges depending on the optical transparency and flexibility desired for the electrostatographic member. Accordingly, for a flexible photoresponsive imaging device the thickness of the conductive layer 41 is preferably between about 0.005 microns to about 0.075 microns.

The conductivity of the seam is very important for electrostatographic imaging members and the desired conductivity of the seam can be achieved by a variety of methods. One method is the introduction of a conductive adhesive to join the metallized substrate comprised of substrate 10 and conductive layer 41.

A conductive adhesive 48 is applied to kerf or gap 20 to complete the circuit between the two mating puzzle cut surfaces and the rest of the belt. Adhesives containing conductive materials such as metallized dispersions of silver, indium tin oxide, CuI and SnO or charge transfer complexed formulation such as TCNQ, Quinoline may be used. Also the adhesive may contain conductive fillers such as carbon black silver, NiO and ionic conductive complexes such as quaternary ammonium salts to make them electrically conductive.

For thermal plastic materials, a cure temperature of the adhesive that is below the distortion temperature of the parent material is desirable. Room temperature cure yields the least distortion in the seam area. Temperature curing ranges can include room temperature–600° F., with preferred temperature curing ranges between 250° F.–375° F. Ultraviolet adhesives can also be used.

It is very important that the seam is mechanically and electrically invisible in an electrostatographic imaging member. One method includes tailoring the viscosity of the adhesive, matching the surface energies of the materials and cure times to enable flattening in a controlled period of time. Another technique that can be used is the application of the adhesive with a mechanical following device. The adhesive is applied as a bead and then a mechanical blade, brush or air stream follows the applicator to level the bead. Yet another way to level the seam is by a fixturing device that applies a load forcing the adhesive into the seam and leveling the adhesive bead. The more pressure applied, the more leveling of the seam. The pressure required is a function of the viscosity of the material being used and with the above mentioned adhesives, pressures may range from 0.05 PSI–80 PSI and preferably range from 55–65 PSI.

Once the adhesive has been applied to the puzzle cut seam, additional layers can be applied to the entire belt with conventional dip and spray processes. The first layer to be applied over the seam is charge blocking layer 42. Electron blocking layers for positively charged photoreceptors allow holes from the imaging surface of the photoreceptor to migrate toward the conductive layer and inhibit electrons from the ground plane from injecting and neutralizing the positive surface charges. Similarly, for negatively-charged photoreceptors, any suitable charge blocking layer capable of forming a barrier to prevent hole injection from the conductive layer and which allows negative charge to migrate toward the conductive layer to the photoconductive layer may be utilized.

A hole or negative charge blocking layer may be applied to the conductive surface of the substrate. Some materials can form a layer that functions as both an adhesive layer and charge blocking layer. Typical blocking layers include polyvinylbutyral, organosilanes, epoxy resins, polyesters, polyamides, polyurethanes, silicones and the like. The polyvinylbutyral, epoxy resins, polyesters, polyamides, and polyurethanes can also serve as an adhesive layer. Adhesive and charge blocking layers preferably have a dry thickness between about 20 Angstroms and about 2,000 Angstroms.

The silane reaction product described in U.S. Pat. No. 4,464,450 is particularly preferred as a blocking layer material because its cyclic stability is extended. The entire disclosure of U.S. Pat. No. 4,464,450 is incorporated herein by reference. Typical hydrolyzable silanes include 3-aminopropyltriethoxysilane, N-aminoethyl-3-aminopropyltrimethoxysilane, N-2-aminoethyl-3-aminopropyltrimethoxysilane, N-2-aminoethyl-3-aminopropyltri(ethylethoxy) silane, p-aminophenyltrimethoxysilane, (N,N'-dimethyl 3-amino) propyltriethoxy-silane, 3-aminopropylmethyldiethoxysilane, 3-aminopropyltrimethoxysilane, N-methylaminopropyltriethoxysilane, methyl(2-(3-trimethoxysilylpropylamino)ethylamino)-3-proprionate, (N,N'-dimethyl-3-amino)propyltriethoxysilane, N,N-dimethylaminophenyltriethoxysilane, trimethoxysilylpropyldiethylenetriamine and mixtures thereof. Generally, satisfactory results may be achieved when the reaction product of a hydrolyzed silane and metal oxide layer forms a blocking layer having a thickness between about 20 Angstroms and about 2,000 Angstroms.

Other patents which disclose suitable blocking layer materials include U.S. Pat. Nos. 5,091,278, 5,105,222 and 5,385,796, these references being hereby incorporated by reference. Example II of U.S. Pat. No. 5,385,796 discusses a blocking layer of intermediate thickness of 0.8–1.0 microns, Table B shows how varying material compositions of poly(4-vinyllpyridine) (P(4 VPy)) and poly(2-hydroxyethylmethacrylate) (P(HEMA)) affect belt performance. A relatively thick blocking layer of approximately 8.5 microns is disclosed in Example VIII in device Vlild where P(HEMA) is used.

The blocking layer 42 may be applied by any suitable conventional technique such as spraying, dip coating, draw bar coating, gravure coating, silk screening, air knife coating, reverse roll coating, vacuum deposition, chemical treatment and the like. Dip coating is a preferred method of applying the blocking layer to the seamless belt of the invention and is discussed below in greater detail with respect to all of the applied coatings.

An intermediate layer 43 between the blocking layer 42 and the charge generating or photogenerating layer 44 may be desired to promote adhesion and to provide a smooth surface over imperfections in the seam. This layer could be up to 20 microns in thickness depending on the roughness of the seam. This layer can be coated by conventional methods including dip, draw bar, spray, etc. The role of this layer is to provide a smooth surface over the roughness of the surface imperfections of the seam. This enables coating of the additional layers above the intermediate layer. Electrically this layer could be an insulator but must enable negative charge transport out of the generator layer toward the substrate for negative charged devices and hole charge transport toward the substrate for positive charged devices. For example, a negatively charged transport layer that could be utilized is disclosed in U.S. Pat. No. 4,474,865, hereby incorporated by reference. Alternatively, the layer could be a conductive layer that does not inject positive charge into the photogenerating layer 44. Examples of this are described in U.S. Pat. No. 4,657,835, also hereby incorporated by reference. In cases where the intermediate layer 43 does not inject positive charge into the photogenerating layer 44, the blocking layer 42 may not be required.

The adhesive layer 43 may comprise any known adhesive for layers of an electrostatographic imaging member including film-forming polymers such as polyester, duPont 49,000 resin (available from E.I. duPont de Nemours & Co.), Vitel PE-100 (available from Goodyear Rubber & Tire Co.), polyvinybutyral, polyvinylpyrrolidone, polyurethane, polymethyl methacrylate, or the like.

The large thicknesses of the undercoating layers are needed for applications where the development system is especially discriminating. A relatively thick undercoating layer of several microns can be applied to mask any surface imperfections at the seam. By choosing the correct leveling of the undercoating layers, a "smooth" surface can be provided on which to coat the CGL and CTL.

A charge generating (photogenerating) layer (CGL) 44 may then be applied onto the blocking layer 42 if layer 43 is not used. A charge transport layer (CTL) 45 may be applied onto the charge generating layer 44. The charge transport layer 45 may comprise any suitable transparent organic polymer or nonpolymeric material capable of supporting the injection of photogenerated holes or electrons from the charge generating layer 44 and allowing the transport of these holes or electrons through the organic layer to selectively discharge the surface charge.

Any suitable and conventional technique may be utilized to mix and thereafter apply the CGL coating mixture and the CTL coating mixture to the previously applied layer. Typical application techniques include spraying, dip coating, roll coating, wire wound rod coating, and the like. Drying of the deposited coating may be effected by any suitable conventional technique such as oven drying, infra-red radiation drying, air drying and the like, to remove substantially all solvents utilized in applying the coating.

The charge generating layer 44 generally ranges in thickness from about 01. microns to about 5.0 microns. The charge generating layer thickness is related to binder content. Higher binder content compositions generally require thicker layers to give equivalent pigment coverage for identical photogeneration capability. The thickness of the charge transport layer 45 may range from about 10 to about 50 microns.

Dip coating is a preferred method for application of the active layers due to the difficulty of application to a flexible substrate once it has been converted to a closed loop. U.S. Pat. No. 4,610,942 patent describes a basic dip coating process used to apply the CGL and CTL layers. U.S. Pat. No. 5,334,246 discloses an efficient system of dip coating a hollow cylindrical member with the charge blocking, charge generating and charge transport layers. U.S. Pat. No. 5,633,046 discloses dipping a substrate more than once in a particular active layer material in order to increase the thickness of the layer. The various materials and methods of coating the applied layers disclosed in the above references are all hereby incorporated by reference.

A ground strip 47 may comprise a film-forming polymer binder and electrically conductive particles. Cellulose may be used to disperse the conductive particles. The ground strip layer 46 may have a thickness from about 7 microns to about 42 microns.

The above cross referenced patent applications together with the patents cited herein are hereby incorporated by reference in their entirety in the instant application. It is, therefore, apparent that there has been provided in accordance with the present invention, a "seamless" electrostatographic imaging member that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A process for fabricating an endless flexible seamed electrostatographic belt formed by joining two ends of a flexible substrate, each end of which has a plurality of mutually mating elements in a puzzle cut pattern the opposite surfaces, comprising:

interlocking of the two ends of the flexible substrate to prevent separation, the surfaces of the mutually mating elements defining a gap therebetween;

applying bonding material to the gap between the surfaces of the two ends such that there is absent any substantial thickness differential between the seam and the portions of the belt adjacent the seam, wherein the bonding material is electrically conductive; and coating the flexible substrate and bonded seam with an undercoating layer such that the belt surface including the seam is substantially smooth.

2. The process as claimed in claim 1, further comprising: coating the belt with a charge generating layer after the undercoating layer has been applied.

3. The process as claimed in claim 2, further comprising: coating the belt with a charge transfer layer after the charge generating layer has been applied.

4. The process as claimed in claim 1, wherein the flexible substrate has a conductive layer applied thereto.

5. The process as claimed in claim 1, wherein the seam height above the belt surface is approximately 20 microns or less.

6. The process as claimed in claim 1, wherein the undercoating layer is coated to a thickness between 0.1 to 40 microns.

7. The process as claimed in claim 6, wherein the undercoating layer is coated to a thickness between 1 to 20 microns.

8. The process as claimed in claim 1, wherein coating the flexible substrate and seam with the undercoating layer includes:

dipping the belt in undercoating layer material to insure proper leveling of the undercoating layer.

9. An endless flexible seamed electrostatographic belt formed by joining two ends of a flexible substrate, each end of which has a plurality of mutually mating elements in a puzzle cut pattern, the opposite surfaces of which are in interlocking relationship to prevent separation of the two ends, the surfaces of the mutually mating elements defining a gap therebetween to permit the presence of a bonding material comprising:

bonding material in the gap between the surfaces of the mutually mating elements which forms a bonded seam, wherein the bonding material is electrically conductive; and an undercoating layer covering the substrate and the bonded seam such that the belt surface including the bonded seam is substantially smooth.

10. The belt as claimed in claim 9, further comprising: a charge generating layer on top of the undercoating layer.

11. The belt as claimed in claim 10, further comprising: a charge transfer layer on top of the charge generating layer.

12. The belt as claimed in claim 11, further comprising: a conductive layer formed on top of the substrate and under the undercoating layer.

13. The belt as claimed in claim 9, wherein the belt seam height is less than 20 microns greater than the height of the substrate and conductive layer.

14. The belt as claimed in claim 9, wherein the undercoating layer is between 0.1 to 40 microns thick.

15. The belt as claimed in claim 13, wherein the undercoating layer is preferably 10 to 20 microns thick.

16. The belt as claimed in claim 9, wherein the undercoating layer is a charge blocking layer.

17. An endless flexible seamed electrostatographic imaging belt formed by joining two ends of a flexible substrate, each end of which has a plurality of mutually mating elements in a puzzle cut pattern, the opposite surfaces of which are in interlocking relationship to prevent separation of the two ends, the surfaces of the mutually mating elements defining a gap therebetween to permit the presence of a bonding material comprising:

a conductive layer covering the substrate;

a conductive bonding material in the gap between the surfaces of the mutually mating elements which forms a bonded seam;

an undercoating layer covering the substrate and the bonded seam such that the belt surface including the bonded seam is substantially smooth;

a charge generating layer covering the undercoating layer; and a charge transport layer covering the charge generating layer.

* * * * *